(12) United States Patent
Magri et al.

(10) Patent No.: US 8,720,215 B2
(45) Date of Patent: May 13, 2014

(54) AIR-CONDITIONING SYSTEM FOR TRUCKS

(75) Inventors: Marco Magri, Molinella (IT); Davide Bandiera, Argenta (IT)

(73) Assignee: Lombardini S.R.L., Reggio Emilia (IT)

( * ) Notice: Subject to any disclaimer, the term of this patent is extended or adjusted under 35 U.S.C. 154(b) by 1218 days.

(21) Appl. No.: 11/579,820

(22) PCT Filed: May 6, 2005

(86) PCT No.: PCT/IB2005/001225
§ 371 (c)(1),
(2), (4) Date: Jan. 7, 2008

(87) PCT Pub. No.: WO2005/108133
PCT Pub. Date: Nov. 17, 2005

(65) Prior Publication Data
US 2008/0163633 A1 Jul. 10, 2008

(30) Foreign Application Priority Data

May 7, 2004 (IT) ............................... BO2004A0293

(51) Int. Cl.
*F25B 27/00* (2006.01)
*B60H 1/32* (2006.01)

(52) U.S. Cl.
USPC .................. 62/236; 62/244; 62/239

(58) Field of Classification Search
USPC ............................................. 62/236, 239, 244
See application file for complete search history.

(56) References Cited

U.S. PATENT DOCUMENTS

| 4,051,691 A | * | 10/1977 | Dawkins .......................... 62/236 |
| 4,271,677 A | | 6/1981 | Harr et al. |
| 4,756,359 A | | 7/1988 | Greer et al. |
| 4,825,663 A | * | 5/1989 | Nijjar et al. ..................... 62/236 |
| 5,333,678 A | | 8/1994 | Mellum et al. |
| 6,205,802 B1 | * | 3/2001 | Drucker et al. ................. 62/236 |
| 6,932,148 B1 | * | 8/2005 | Brummett et al. .............. 165/43 |
| 7,150,159 B1 | * | 12/2006 | Brummett et al. .............. 62/236 |
| 2003/0141049 A1 | | 7/2003 | Kennedy |

* cited by examiner

*Primary Examiner* — Cassey D Bauer
(74) *Attorney, Agent, or Firm* — Banner & Witcoff, Ltd.

(57) ABSTRACT

An auxiliary air-conditioning system for a motor vehicle, in particular a truck comprising a tractor provided with a driving cab and possibly a sleeper compartment, and a primary air-conditioning system connected to the main engine and to the battery of the truck. The auxiliary air-conditioning system is totally independent of the primary air-conditioning system of the truck and is formed by an external unit designed to be set on the outside of the driving cab and/or of the sleeper compartment, and by at least one heat-exchange unit, which is hydraulically and electrically connected to the external unit and is designed to be set inside the driving cab and/or inside the sleeper compartment.

20 Claims, 3 Drawing Sheets

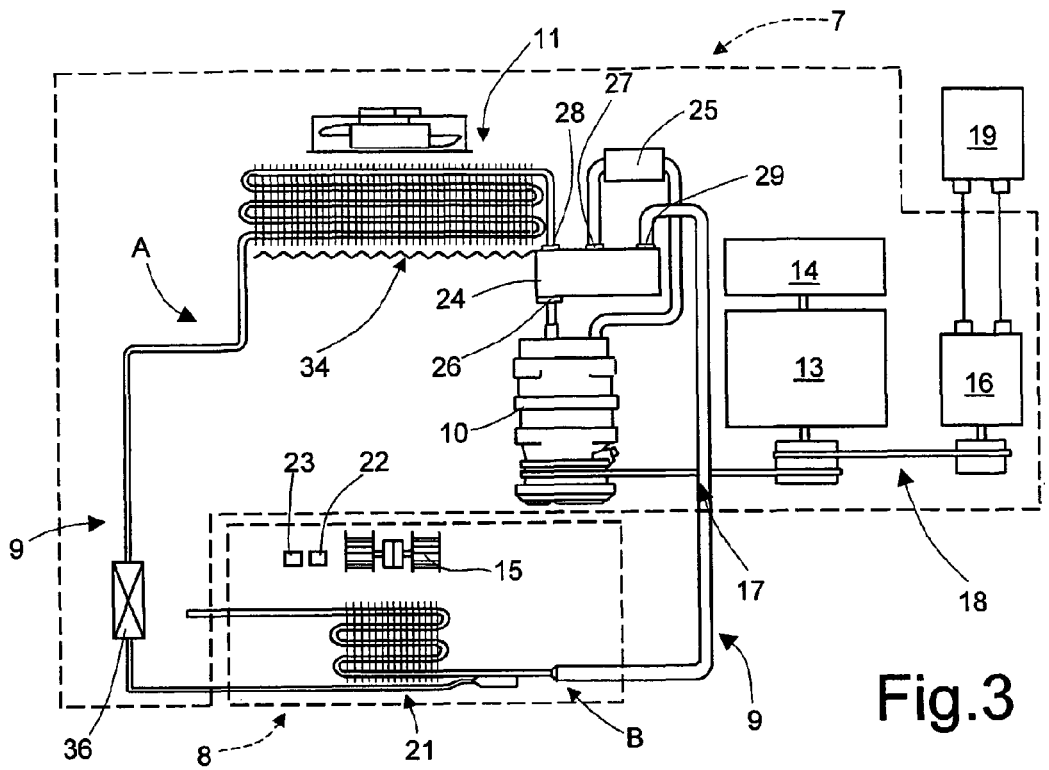
Fig.3
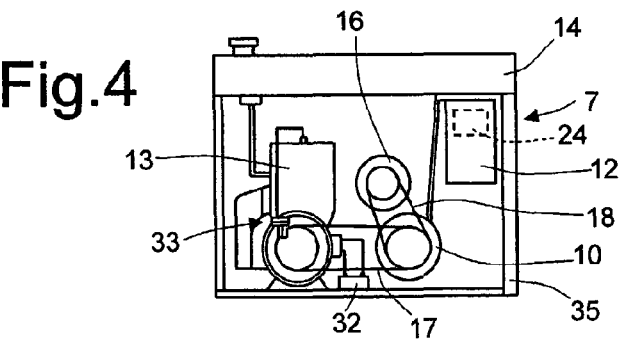
Fig.4
Fig.5
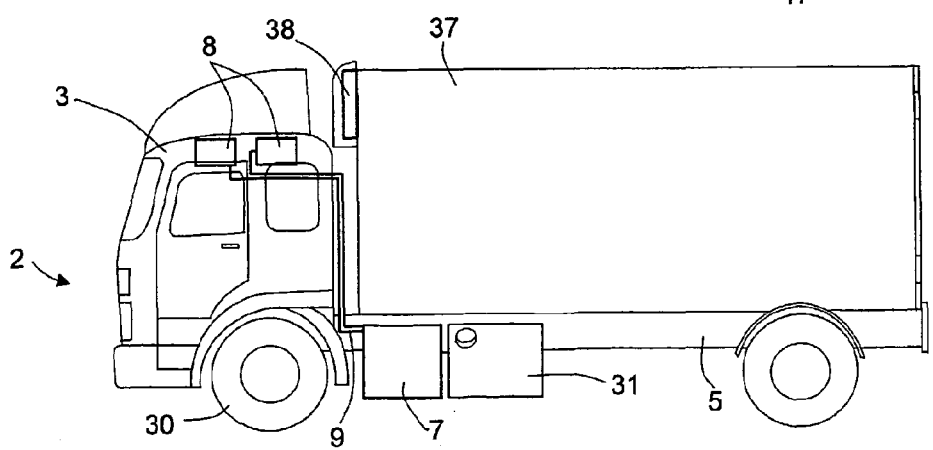

AIR-CONDITIONING SYSTEM FOR TRUCKS

TECHNICAL FIELD

The present invention relates to an air-conditioning system for trucks and, more in particular, to a system for regulating the temperature of the driving cab and/or of the sleeper compartment of trucks for the purpose of improving the comfort and safety conditions of drivers and of possible passengers.

In what follows, the term "air-conditioning system" is meant to indicate a system capable of introducing into the driving cab and/or into the sleeper compartment air that is cooler and/or warmer than that of the outside environment.

Hence, the term "air-conditioning system" is used to indicate indifferently a conditioning system capable of producing only cool air, or else a conditioning system capable of producing both warm and cool air.

Furthermore, in the course of the present treatment, reference will be made, by way of example, to trucks, at the same time meaning in any case all types of motor vehicles such as automobiles, campers, and in general all vehicles provided with a closed cab and a main engine.

BACKGROUND ART

In general, motor vehicles and trucks of a known type are provided with a conventional air-conditioning system, i.e., a system of the type comprising a compressor, a condenser/electric-fan assembly, an expansion valve and an evaporator/electric-ventilator assembly, set cascaded to one another along a refrigerating circuit containing a coolant, for example R410A, and in which, in a way similar to what occurs in an automobile, the compressor is driven via a belt by the internal-combustion engine of the truck when said internal-combustion engine is running.

In this way, the air-conditioning system can be freely used in travelling conditions. However, when the truck is parked for a pause, to enable the driver to rest or have a sleep, it would be necessary to keep the engine running if the aim is to keep the air-conditioning system operating.

It is evident that the need to keep the engine of the truck running for the purpose indicated above represents a far from efficient use of the engine and moreover leads to early wearing-out of the latter, as well as high values of fuel consumption and of pollutant emissions.

With the purpose of overcoming these drawbacks, auxiliary air-conditioning systems have been proposed, designed to be connected to the primary air-conditioning system, i.e., the pre-existing one, of the truck and provided with an auxiliary air-conditioning unit comprising a small auxiliary internal-combustion engine, an auxiliary compressor, and an auxiliary condenser/electric-fan assembly. Said auxiliary unit is connected, by means of pipes and valves, in parallel with the corresponding air-conditioning unit of the primary system so as to be able to close a refrigerating circuit alternatively with the aforementioned expansion valve and with the aforementioned evaporator/electric-ventilator assembly of the primary system.

One such solution, albeit overcoming the drawbacks listed above, entails a costly and complex modification of the primary air-conditioning system.

DISCLOSURE OF INVENTION

The aim of the present invention is to provide an air-conditioning system for trucks, which is, at the same time, simple and economically advantageous to install and is able to function as auxiliary air-conditioning system, independently of the internal-combustion engine of the truck.

According to the present invention, an air-conditioning system for trucks is provided as specified in claim 1.

The dependent claims refer to preferred and advantageous embodiments of the invention.

BRIEF DESCRIPTION OF THE DRAWINGS

Embodiments of the present invention are described in what follows, purely by way of non-limiting example, with the aid of the attached drawings, wherein:

FIGS. 2 and 3 are schematic illustrations of two respective embodiments of the air-conditioning system according to the present invention;

FIG. 4 is a schematic illustration of the arrangement of some components of a part of the air-conditioning system according to the present invention;

FIG. 5 is a schematic illustration of a truck provided with a system according to the invention applied to a refrigerating cell.

BEST MODE FOR CARRYING OUT THE INVENTION

Figure 1:
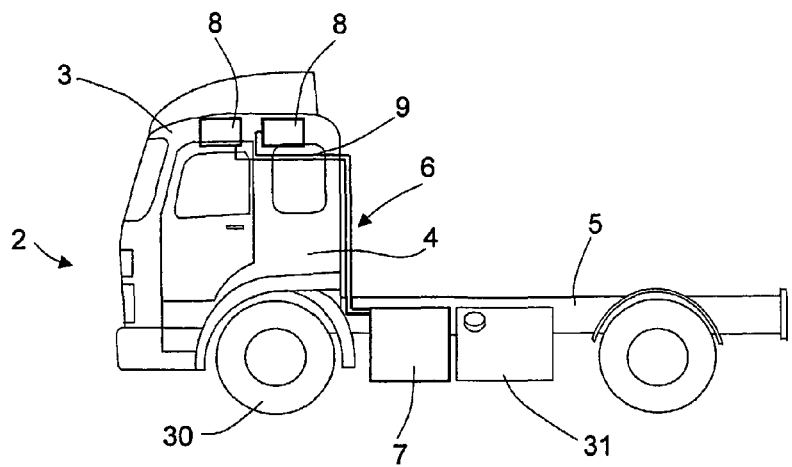
FIG. 1 is a schematic illustration of a truck provided with an air-conditioning system made according to the present invention.

In FIG. 1, the reference numeral 1 identifies a truck having a tractor 2 provided with a driving cab 3 and a sleeper compartment 4, and a chassis 5 for supporting the cab 3, the sleeper compartment 4, and all the other components of the truck.

According to a variant (not illustrated), the sleeper compartment 4 is absent. The air-conditioning system of the present invention is designated as a whole by the reference number 6 and comprises an external unit 7, which is set outside of the driving cab 3 and of the sleeper compartment 4, and at least one internal heat-exchange unit 8. In the example illustrated in the figures, two heat-exchange units 8 are represented, which are independent of one another and one of which is set within the driving cab 3 and the other within the sleeper compartment 4.

It is clear that it is also possible to use just one heat-exchange unit 8, which can in any case be set in the most convenient place, in the driving cab 3 or else in the sleeper compartment 4.

Set in a suitable position on the chassis 5 is the external unit 7, which is hydraulically and electrically connected to the heat-exchange unit 8 by means of respective connection pipes and cables designated, as a whole, by the reference number 9.

Figure 2:
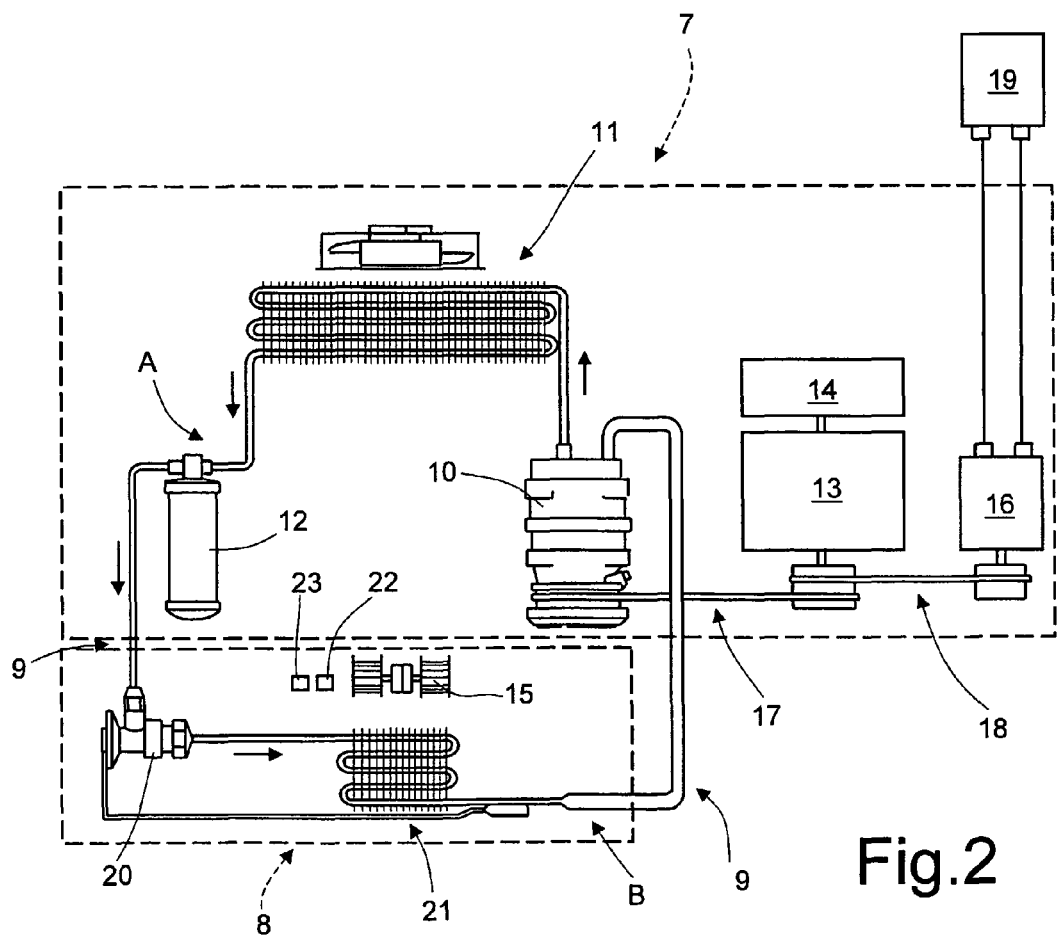

As shown in FIGS. 2 and 4, the external unit 7 comprises a compressor 10, a condenser/electric-fan assembly 11, a filter 12, an internal-combustion engine 13, a fuel tank 14, an alternator 16, first belt-connection means 17 interposed between the compressor 10 and the engine 13, and second belt-connection means 18 interposed between the engine 13 and the alternator 16.

The compressor 10, the condenser/electric-fan assembly 11 and the filter 12 are cascaded to one another along a refrigerating circuit A.

The compressor 10 is of the open type normally used for motor vehicles and is hence mechanically connected to the internal-combustion engine 13 via the aforementioned first belt-connection means 17, or else, according to an alternative embodiment, the compressor 10 can be of a hermetic type and is hence driven by an electric motor (not illustrated) within the compressor 10 itself. In turn, the electric motor of the compressor 10 receives the necessary electric power from the alternator 16 and consequently, in this embodiment (not illustrated), the mechanical connection between the compressor 10 and the internal-combustion engine 13 is not present.

The alternator 16, of the type used in motor vehicles, has a voltage and power suitable for the starting battery 19 of the truck 1. The alternator 16 is connected to the battery 19, thus enabling its recharging.

The heat-exchange unit 8 comprises an expansion valve 20 and an evaporator/electric-ventilator assembly 21, set cascaded to one another along a refrigerating circuit B.

The evaporator/electric-ventilator assembly 21 comprises in particular a centrifugal ventilator fan 15, a receiver 22 (not illustrated) for enabling remote control thereof, and a thermostat 23 for controlling the engine 13 and hence the compressor 10.

In greater detail, the remote control comprises an ON-OFF control and a control for regulating the temperature that acts on the thermostat 23 of the heat-exchange unit 8 in the cab. The refrigerating circuits A and B are connected to one another by the aforementioned connection pipes (which form part of the connection means 9) for defining a closed circuit for circulation of a coolant, for example R410A.

As is known, the coolant is heated via compression by the compressor 10 starting from a gaseous state. Then, as it arrives in the condenser/electric-fan assembly 11, it yields heat to the outer environment and passes into the liquid state. When the liquid reaches the expansion valve 20, it undergoes a pressure drop and, at the evaporator/electric-ventilator assembly 21, it absorbs heat from the surrounding environment and returns into the gaseous state that it was in at the start of the thermodynamic cycle.

In this way, the heat-exchange unit 8 introduces into the corresponding ambient air that is cooler than the air present outside the truck 1. FIG. 5 illustrates a variant of the invention applied to a refrigerating cell 37 mounted on the truck 1. For the purpose of cooling the refrigerating cell 37, a refrigerating assembly 38 is present, which is in turn connected to the external unit 7 via the means 9. In this case, the same unit 7 can actuate the refrigerating assembly 38 and also one or more internal heat-exchange units 8.

An important peculiarity of the present invention is represented by the fact that the air-conditioning system 6 is an auxiliary system that is totally independent of the primary air-conditioning system (not illustrated) and of the engine (not illustrated) for driving the truck 1. In other words, the system 6 can be installed on the truck 1 and removed therefrom without there being the need for any modifications or interventions on the primary air-conditioning system or on the main engine, with the corresponding transmissions, of the truck 1.

In particular, the compressor 10, the condenser/electric-fan assembly 11, the filter 12, the engine 13, the tank 14, the alternator 16, the first belt-connection means 17, the second belt-connection means 18, the expansion valve 20, and the evaporator/electric-ventilator assembly 21 are components that are completely autonomous with respect to the corresponding elements of the primary air-conditioning system, and their operation is independent of that of the latter.

Hence, the auxiliary air-conditioning system 6 described above can operate simultaneously with the primary air-conditioning system.

Another important peculiarity of the present invention is represented by the fact that the air-conditioning system 6, during its operation, can recharge the battery 19 of the truck 1. Furthermore, the alternator 16 is of a power such as to enable also starting of the main engine of the truck, in the case where the battery 19 of the latter is run down.

Another important peculiarity of the present invention is represented by the fact that the external unit 7 is of compact dimensions and can be conveniently housed on the chassis 5. For example, according to what is illustrated in FIG. 1, the unit 7 can be housed between the front wheel 30 of the truck and the fuel tank 31 of the truck.

According to what is illustrated in FIG. 4, the entire unit 7 forms an autonomous and compact assembly, supported and contained within a containment frame 35, which can also contain the condenser/electric-fan assembly 11, thus rendering installation of the unit 7 on the truck very simple.

The engine 13 can comprise an electrical starting system of its own (not illustrated) with a corresponding battery 32, independent of the battery 19 of the truck so that it is always possible to start the engine 13 even if the battery 19 of the truck were to run down. In this case, as already indicated above, it is possible to envisage recharging of the battery 19 of the truck via the alternator 16 of the unit 7 and also at starting of the main engine of the truck.

Alternatively, the engine 13 with the corresponding starting system (not illustrated) can be connected directly to the battery 19 of the truck, and the battery 32 on the system 6 is hence absent.

The engine 13 can comprise an emergency starter 33 of a manual type, for example, a recoil starter; in the case where the battery 19 of the main engine or else the battery 32 of the system 6 is run down, the engine 13 can be started with the emergency starter 33.

As already mentioned above, the remote control (not illustrated) of the unit 8 actuates the internal-combustion engine 13, by means of the receiver 22, which is in turn connected to the starting device of the engine 13 via the cables that form part of the connection means 9.

Next, after an appropriate delay time, for example after one minute, also the compressor 10 actuated by the engine 13 starts.

Whereas the internal-combustion engine 13 always remains running during operation of the system 6, thus continuously recharging the battery 19 of the truck, the compressor 10 starts or stops according to the temperature detected by the thermostat 23 of the unit 8 and/or according to a signal issued by the antifreeze sensor in the case where the latter is present in the cab. Finally, when the remote control is in the off position, also the engine 13 and all the corresponding devices, including the compressor 10, are turned off.

In the case of breakdown of the remote control, an emergency key-starting device is envisaged that can be positioned directly on the external unit 7 or else be located in the cab 3 of the truck, being connected to the unit 7 via the aforesaid connection means 9.

Normally, the temperature to be reached in the cab 3 is regulated with the remote control, but also an emergency manual control can be provided on the heat-exchange unit 8.

The engine 13 is of the internal-combustion type and can be cooled by air or else by water. Furthermore, it can be of the Otto-cycle petrol type, or else of the diesel type. In the latter case, the tank 14 can be eliminated because it is possible to use the same fuel for the main engine for driving the truck, which in general is also of a diesel type.

Another important peculiarity of the present invention is represented by the fact that the air-conditioning system 6 can serve two heat-exchange units 8 separately.

In the variant illustrated in FIG. 3, the thermodynamic cycle of the air-conditioning system 6 is rendered reversible, i.e., the system 6 of FIG. 3 is of the "heat pump" type, and each heat-exchange unit 8 is able to introduce alternatively into the corresponding environment air that is cooler or warmer than the air present outside the truck 1.

The system 6 of FIG. 3 differs from that of FIG. 2 in that it comprises a reverse-cycle valve 24, a throttle valve 36 and a liquid dehydrator and accumulator 25. The valve 24 has an inlet opening 26 connected to the delivery pipe of the compressor 10, an outlet opening 27 connected to the intake pipe of the compressor 10 through the dehydrator 25, and two inlet/outlet openings 28 and 29, the former of which is connected to the condenser/electric-fan assembly 11 and the latter to the evaporator/electric-ventilator assembly 21.

The valve 24 moreover has an internal selector which, in the cooling operation, sets in communication with one another, on the one hand, the openings 26 and 28 and, on the other, the openings 27 and 29. The same selector, in the heating operation, sets in communication with one another, on the one hand, the openings 26 and 29 and, on the other, the openings 27 and 28.

In the case where the system 6 functions as heater, the condenser/electric-fan assembly 11 becomes an evaporator and thus tends to cool off considerably until ice is formed on its outer surface.

In order to prevent this drawback, the condenser/electric-fan assembly 11 can be provided with an electrical resistor 34 for preventing the aforesaid formation of ice.

Figure 6:
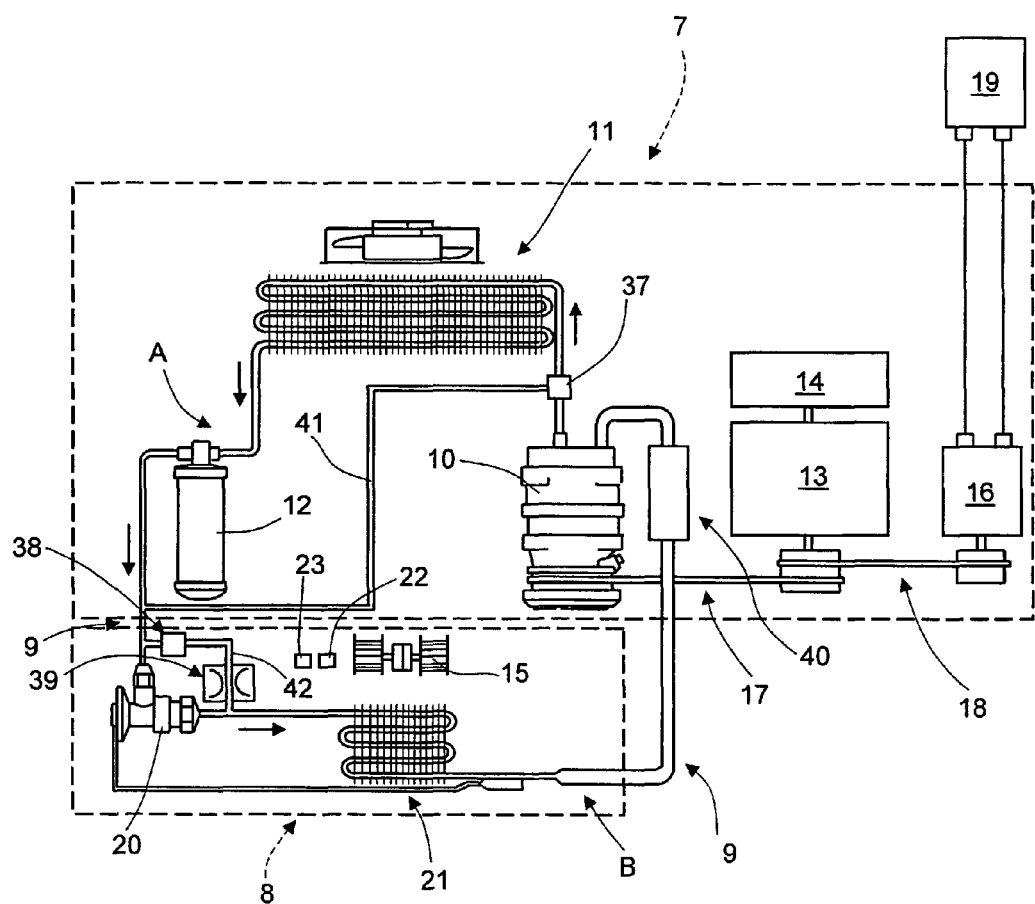
FIG. 6 is a schematic illustration of a third embodiment of the air-conditioning system according to the present invention.

FIG. 6 illustrates an air-conditioning system according to a variant embodiment alternative to that of FIG. 3, in which the air-conditioning system 6 is able to produce heat by simple compression of the fluid, instead of by means of a heat-pump reverse refrigerating cycle.

According to said variant, which is described only in so far as it differs from the system of FIG. 2, the same reference numbers being used to designate parts that are the same as or similar to parts already described, the system 6 comprises a first by-pass line 41 connected to the circuit A in parallel to the condenser/electric-fan assembly 11 and to the filter 12, and a second by-pass line 42 connected to the circuit A in parallel with the expansion valve 20.

More in particular, the first by-pass line 41 is connected to the outlet of the compressor 10 via a two-position three-way solenoid valve 37, and converges in the circuit A downstream of the filter 12.

Set on the second by-pass line 42 are: a by-pass solenoid valve 38, which, when it is open, causes the coolant fluid to by-pass the expansion valve 20 flowing through the second by-pass line 42; and a restriction 39, designed to create a concentrated head loss and, hence, a drop in pressure of the coolant.

The restriction 39 can have a fixed cross section or else one that is adjustable via the control system.

Conveniently set upstream of the compressor 10 is a liquid accumulator 40 having the purpose of preventing the presence of any liquid in the compressor.

Operation of the system of FIG. 6 is described in what follows.

When the system is set in the "cooling" mode, the solenoid valve 37 connects the condenser/electric-fan assembly 11 to the compressor 10, and the by-pass solenoid valve 38 is closed. Operation is consequently identical to what has been described with reference to the system of FIG. 2.

In the "heating" mode, the solenoid valve 37 activates the first by-pass line 41, thus excluding the condenser/electric-fan assembly 11. In a similar way, the by-pass solenoid valve 38 is open and excludes the expansion valve 20, thus enabling flow of the coolant fluid through the restriction 39.

The coolant fluid at a high temperature traverses the evaporator 21 and yields heat to the environment.

In the case where the restriction 39 has a fixed (i.e., non-adjustable) cross section, the control system causes the engine 13 to turn off when the set temperature is reached in the environment to be heated. If the temperature drops below a lower threshold temperature depending upon the pre-set temperature, the engine 13 re-starts and sets the system in operation, which consequently operates in an ON-OFF mode.

In the case where the restriction 39 has an adjustable cross section, said cross section can be regulated by the control system according to the temperature set and to the environmental temperature detected. In this way, the engine 13 always remains in operation, with variations in load, and the system modulates the thermal power delivered.

The system 6 with the heating function obtained by compression has a lower efficiency as compared to the heat-pump solution, but is free from the application limits connected to the use of the heat-pump cycle and linked to the formation of ice on the condenser/electric-fan assembly.

The air-conditioning system for trucks according to the present invention is constructionally simple and compact, and enables the operation of air-conditioning to be obtained both in cooling and in heating, in the reverse-cycle and compression version.

Furthermore, it enables recharging of the battery of the truck and hence also starting of the engine of the truck, in the case where the battery of the truck is run down.

The invention thus conceived may likewise undergo other modifications and variations, all of which fall within the sphere of protection of the inventive idea as claimed below.

The invention claimed is:

1. An auxiliary air-conditioning system for a truck that includes a primary air-conditioning system, connected to a main engine and to a supply battery of said truck, the auxiliary air-conditioning system comprising:
   an external unit configured to be located on one of: an outside of a driving cab of the truck or an outside of a sleeper compartment of the truck; and
   at least one internal heat exchange unit configured to be set within said driving cab or said sleeper compartment, the at least one internal heat exchange unit including an auxiliary evaporator/electric-ventilator assembly connected by hydraulic and electrical connection means to said external unit.

2. The system as claimed in claim 1, wherein the external unit comprises an auxiliary compressor, an auxiliary condenser/electric-fan assembly, an auxiliary internal-combustion engine, and an auxiliary alternator.

3. The system as claimed in claim 2, wherein said external unit comprises an auxiliary fuel tank.

4. The system as claimed in claim 3, wherein said auxiliary alternator is connected to the supply battery of the truck and has a voltage and power suitable for recharging the supply battery.

5. The system as claimed in claim 3, wherein said auxiliary compressor is one of: an open type or a hermetic type.

6. The system as claimed in claim 2, wherein said auxiliary compressor is one of: an open type or a hermetic type.

7. The system as claimed in claim 2, wherein said auxiliary alternator is an automobile type.

8. The system as claimed in claim 2, wherein the at least one internal heat exchange unit comprises a valve set in the connection means, configured to switch hydraulic connections between the compressor, the auxiliary evaporator/electric-ventilator assembly, and the auxiliary condenser/electric-fan assembly, to provide an auxiliary air-conditioning system with reversible thermodynamic cycle capable of producing both warm and cool air.

9. The system as claimed in claim 8, wherein a fixed throttle valve is set in the connection means.

10. The system as claimed in claim 2, wherein the external unit forms a compact autonomous assembly, supported and contained within a containment frame, configured to be installed on a chassis of the truck.

11. The system as claimed in claim 10, wherein said auxiliary condenser/electric-fan assembly is contained within the containment frame.

12. The system as claimed in claim 2, wherein said auxiliary alternator is connected to the supply battery of the truck and has a voltage and power suitable for recharging the supply battery.

13. The system as claimed in claim 1, wherein the at least one internal heat exchange unit comprises an auxiliary expansion valve set in the connection means.

14. The system as claimed in claim 1, further comprising a first by-pass line for excluding a condenser/electric-fan assembly controlled by a first solenoid valve, and a second by-pass line for excluding a expansion valve controlled by a second solenoid valve.

15. The system as claimed in claim 14, further comprising a restriction on said second by-pass line.

16. The system as claimed in claim 15, wherein said restriction has a fixed cross section.

17. The system as claimed in claim 15, wherein said restriction has an adjustable cross section.

18. The system as claimed in claim 1, wherein components for operation of the auxiliary air-conditioning system are totally independent of corresponding components for operation of said primary air-conditioning system.

19. An auxiliary air-conditioning system for a truck that includes a primary air-conditioning system, the auxiliary air-conditioning system comprising:
 an external unit configured to be located outside of a driving cab of the truck; and
 an internal heat exchange unit, configured to be located within said driving cab, the at least one internal heat exchange unit including an auxiliary evaporator/electric-ventilator assembly connected to said external unit.

20. An auxiliary air-conditioning system for a truck that includes a primary air-conditioning system, the auxiliary air-conditioning system comprising:
 an external unit configured to be located on one of: an outside of a driving cab of the truck or an outside of a sleeper compartment of the truck; and
 at least one internal heat exchange unit configured to be set within said driving cab or said sleeper compartment, the at least one internal heat exchange unit including an auxiliary evaporator/electric-ventilator assembly connected to said external unit,
 wherein the external unit and at least one internal heat exchange unit of the auxiliary air-conditioning system are configured to be removable from the truck without modification of the primary air-conditioning system.

* * * * *

UNITED STATES PATENT AND TRADEMARK OFFICE
CERTIFICATE OF CORRECTION

PATENT NO.        : 8,720,215 B2                                                                 Page 1 of 1
APPLICATION NO. : 11/579820
DATED             : May 13, 2014
INVENTOR(S)       : Magri et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1535 days.

Signed and Sealed this
Twenty-ninth Day of September, 2015

Michelle K. Lee
*Director of the United States Patent and Trademark Office*